United States Patent [19]

Christensen

[11] 4,224,790
[45] Sep. 30, 1980

[54] JET ENGINE

[76] Inventor: Raymond G. Christensen, 1348 Bellefield Park La., Bellevue, Wash. 98004

[21] Appl. No.: 840,902

[22] Filed: Oct. 11, 1977

Related U.S. Application Data

[63] Continuation-in-part of Ser. No. 664,317, May 5, 1976, abandoned.

[51] Int. Cl.² .......... F02C 1/02; F02K 3/02; F02K 11/02
[52] U.S. Cl. .......... 60/224; 60/269; 60/39.18 C; 60/728
[58] Field of Search .......... 60/269, 39.18 C, 226 R, 60/224, 39.67, 270 R

[56] References Cited

U.S. PATENT DOCUMENTS

| | | | |
|---|---|---|---|
| 2,565,324 | 8/1951 | Ray | 60/39.18 C |
| 2,602,289 | 7/1952 | Anxionnaz et al. | 60/39.67 |
| 3,105,661 | 10/1963 | Ferri | 60/270 R |
| 3,158,990 | 12/1964 | Ferri | 60/203 |
| 3,449,914 | 6/1969 | Brown | 60/226 R |
| 3,486,328 | 12/1969 | Boudigues | 60/226 R |
| 3,609,967 | 10/1971 | Waldmann | 60/39.18 C |
| 3,621,656 | 11/1971 | Pacault et al. | 60/39.67 |
| 3,719,428 | 3/1973 | Dettmering | 60/39.18 C |
| 3,940,926 | 3/1976 | Craig | 60/269 |

FOREIGN PATENT DOCUMENTS 793316   4/1958   United Kingdom .......... 60/226 R

*Primary Examiner*—Robert E. Garrett
*Attorney, Agent, or Firm*—Hughes & Barnard

[57] ABSTRACT

An engine particularly adapted to travel at high supersonic and hypersonic velocities. The engine has a forward turbine positioned at the engine inlet and a rearwardly positioned compressor driven by the turbine through an interconnecting longitudinal shaft. In a first embodiment, a cryogenic fuel, such as hydrogen, is introduced into the engine at a location between the turbine and the compressor, with vaporization and heating of the fuel causing a reduction in the compressor inlet temperature and a consequent increase in compressor discharge for a given turbine power shaft input. The resulting fuel/air mixture passes through the compressor and then into a rearwardly positioned combustion chamber where it is ignited, with the combustion products then being expanded from the compressor discharge pressure to atmospheric pressure through an outlet nozzle as jet exhaust.

In other embodiments, additional heat exchange means are provided between the turbine and compressor, with fuel injection combustion occuring forward of the turbine and also rearwardly of the compressor. In a fifth embodiment, the principle of operation of this engine is incorporated in a fan jet engine.

23 Claims, 5 Drawing Figures

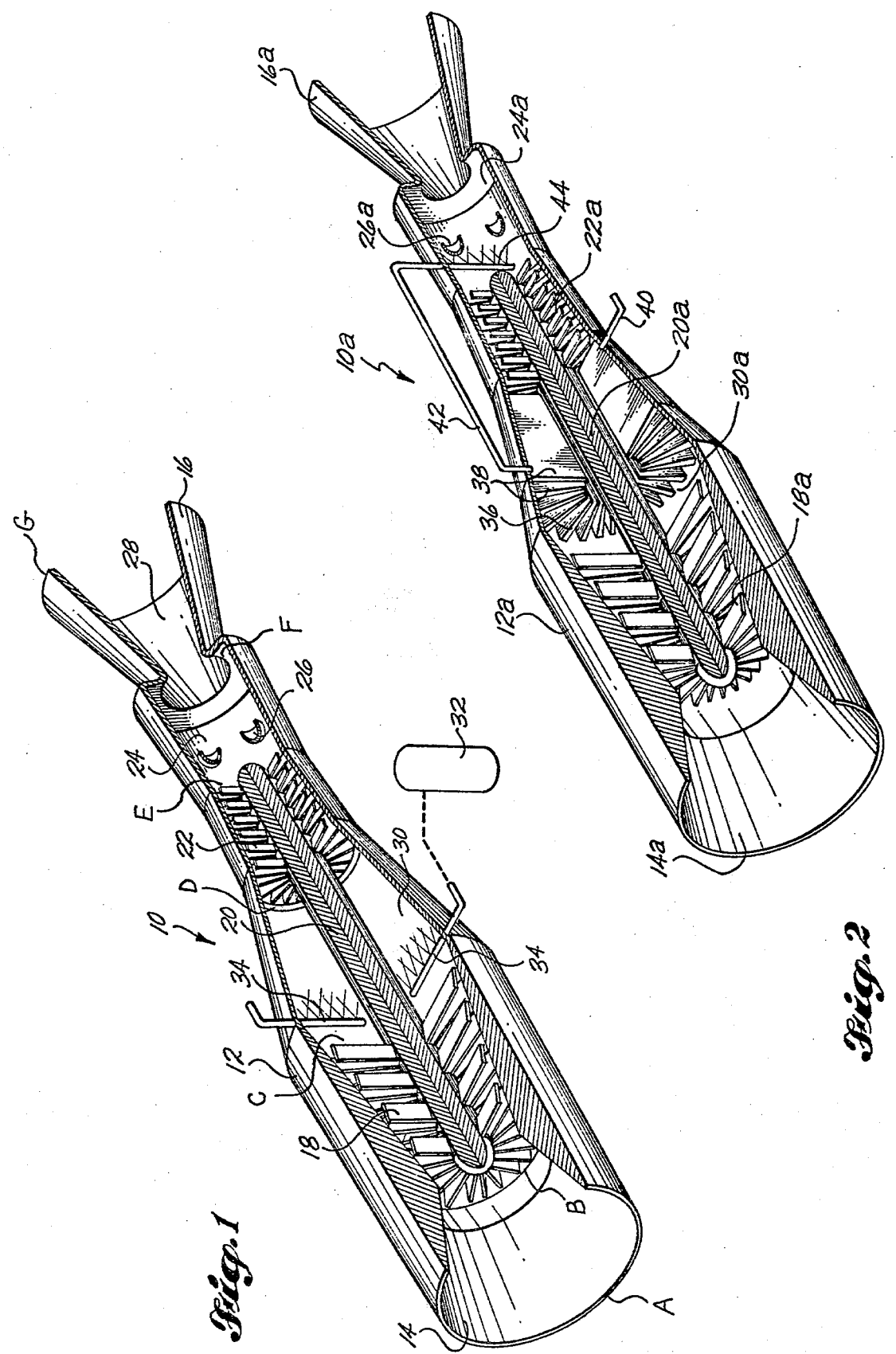

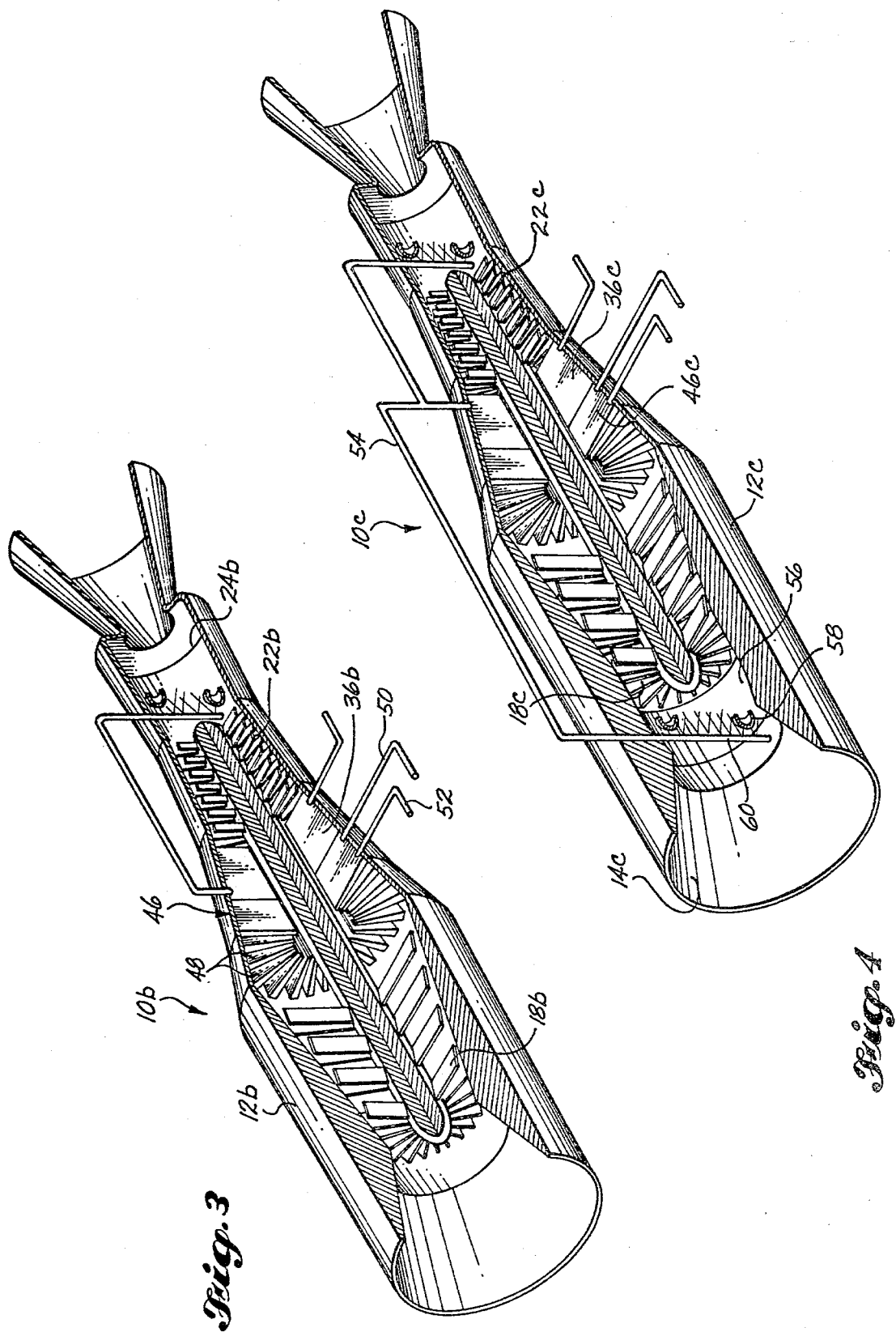

JET ENGINE

CROSS REFERENCE TO RELATED APPLICATION

This is a continuation-in-part application of my co-pending application, Ser. No. 664,317, filed May 5, 1976, now abandoned, entitled "Jet Engine."

BACKGROUND OF THE INVENTION

1. Field of the Invention

The present invention relates to gas turbine engines, and more particularly herein to jet engines especially adapted for travel at high supersonic and hypersonic velocities.

2. Description of the Prior Art

In conventional jet engines, where there is a forward compressor, a rearwardly positioned turbine, and an intermediate combustion chamber, the compressor is exposed to the "total temperature" generated by the flight speed of the aircraft. As the flight speed is increased the power requirements of the jet engine progressively increase while concurrently higher temperatures are generated at the compressor inlet. To compensate for such increased temperatures, it becomes necessary to increase the temperature at the turbine inlet by increasing the fuel/air ratio mixture of the gases entering the combustion chamber ahead of the turbine, in order that the increase in power output available for propulsion is to be obtained. However, as the turbine temperatures approach the limit of turbine blade material capability, increased complexity of the turbine blading and engine design is required, such as blade cooling to permit the metal temperature capabilities to be extended into the higher speed regimes. Finally, a limiting turbine temperature is reached even with blade cooling, and attempts to design an engine which is capable of yet further velocity increases results in severe performance degradation of the engine. Thus, within the practical limitation of present technology, the upper economical limit of speed for jet engines of this conventional design is moderately in excess of Mach 3.

U.S. Pat. No. 3,158,990, Ferri, illustrates a ram jet engine intended for travel at higher than usual velocities. In this engine, there is a forwardly positioned turbine at the engine inlet which extracts energy from the ram air passing into the inlet, so that the temperature of the air passing out the rear end of the turbine is at a reduced temperature. This air then passes through a heat exchanger operating at a sufficiently high temperature to add energy to the air that has passed through the turbine. This air then passes through a compressor and thence out the exhaust nozzle of the engine.

A number of other patents show other engine component arrangements. For example, U.S. Pat. No. 2,623,356, Coanda, shows a turbo jet engine which directs its exhaust gases through a compressor to increase the intake-discharge pressure differential of the engine. This compressor is driven by a forwardly extending longitudinal shaft connected to an upstream turbine.

U.S. Pat. No. 3,098,632, Christenson, shows an apparatus which is mounted to an aircraft to function as a fuel tank and also as a jet engine. The principle of operation of the engine components is generally conventional.

U.S. Pat. No. 3,105,661, Ferri, shows a jet engine where there is a compressor positioned at a radially inward position and a turbine connected to the compressor at a radially outward location. The air passing through the radially outward turbine has energy extracted therefrom and therefore experiences a temperature reduction. This air is directed around the skin of the engine for cooling the engine at high speeds.

U.S. Pat. No. 3,382,678, Reh, shows an engine particularly adapted for generating a high pressure efflux for a boat. Air from a compressor is directed to a combustion chamber. The hot exhaust from the combustion chamber is split to drive a turbine and also to drive a second stage compressor, whose discharge is compressed gas that is used as the exhaust gas for propulsion.

U.S. Pat. No. 3,241,310, Hoadley, shows a jet engine where a cryogenic fuel is placed in heat exchange relationship with the gases in the combustion chamber of the engine. The vaporized cryogenic fuel is then directed through the interior of the rotor blades of a compressor and discharged from the trailing edge of the blades to supply added power to the blades.

U.S. Pat. No. 3,369,361, Craig, shows a gas turbine power plane which utilizes a water spray at the turbine discharge to reduce pressure of the exhaust gases passing through the turbine.

SUMMARY OF THE INVENTION

The jet engine of the present invention is particularly adapted to operate in an aircraft up to velocities in the hypersonic range. The engine has a housing structure with an upstream inlet end with a supersonic inlet, such as a variable geometry inlet, which reduces the velocity of air entering therein to a subsonic velocity, to receive intake air and a downstream exhaust end to discharge jet exhaust. A turbine is mounted within the inlet of the housing to be driven by air flowing into the housing inlet. Downstream of the turbine is mounted a compressor which is arranged to compress the air that is discharged from the turbine and is connected to the turbine through a longitudinal shaft. Downstream of the compressor is a combusion chamber in which a fuel/air mixture is burned, with the resulting combustion products being directed through the discharge end of the housing to provide thrust.

At the location between the upstream turbine and the downstream compressor the housing defines a heat exchange zone to cause a reduction of the temperature of the air discharged from the turbine and into the compressor inlet. The pressure differential from the upstream side to the downstream side of the turbine causes sufficient power to be imparted to the turbine by the air flowing therethrough to supply to the compressor adequate power for its proper operation.

The temperature reduction of the air in the heat exchange zone is accomplished by placing the fuel for the engine (desirably a cryogenic fuel which vaporizes at relatively low temperatures) into heat exchange relationship with the air in the heat exchange zone. In a first embodiment, this is accomplished by injecting the fuel directly into the air passing through the heat exchange zone. In other embodiments, this is accomplished by passing the fuel through a heat exchanger in the heat exchange zone so that heat is absorbed by the fuel with attendant cooling of the compressor inlet air, after which the fuel is injected into the combustion chamber.

In accordance with further embodiments, auxiliary heat exchange means are provided in the heat exchange zone to extract additional heat energy from the air passing through the zone for other purposes (e.g. supplying power for other systems in an aircraft). Also, in accordance with another feature of the present invention, a portion of the fuel which has passed through the heat exchanger in the heat exchange zone is discharged into the air stream forwardly of the turbine and ignited at that location to cause the turbine to be driven by the resulting combustion products. This enables the engine to function at relatively low velocities, where metal temperature capabilities are not being exceeded, to eliminate or reduce the requirement for auxiliary power booster at low speeds.

In a final embodiment, the jet engine of the present invention is incorporated in a fan jet engine. In addition to utilizing the features recited above, fuel can also be injected into and ignited in the fan duct for additional thrust.

Other features of the present invention will become apparent from the following detailed description.

BRIEF DESCRIPTION OF THE DRAWINGS

FIG. 1 is an isometric view of a first embodiment of the present invention where fuel is discharged directly into the air stream in the heat exchange zone of the engine;

FIG. 2 is an isometric view of a second embodiment of the present invention where fuel is placed in indirect heat exchange relationship with air in the heat exchange zone and injected into the combustion chamber for ignition;

FIG. 3 is an isometric view of a third embodiment of the present invention, similar to the second embodiment, and comprising further auxiliary heat exchange means;

FIG. 4 is an isometric view of a fourth embodiment, similar to the third embodiment, and further comprising means to inject fuel into the inlet of the engine for developing static thrust and thus reduce or eliminate the need for boost augmentation;

DESCRIPTION OF THE PREFERRED EMBODIMENTS

Figure 5:
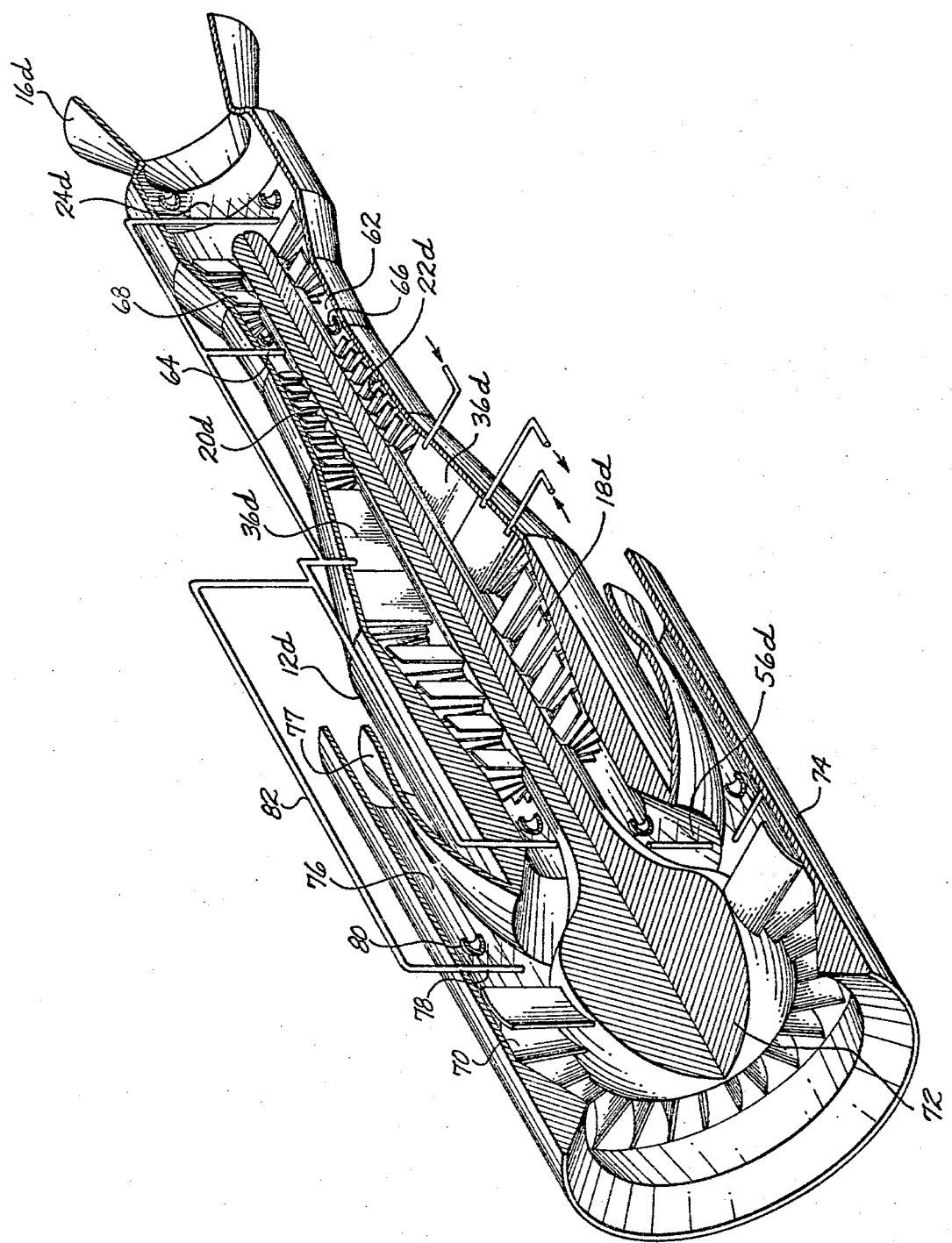
FIG. 5 is an isometric view of yet a fifth embodiment of the present invention, wherein the principle of the present invention is incorporated in a fan jet engine.

In FIG. 1 there is shown a first embodiment of a jet engine 10 of the present invention. This engine 10 comprises an elongate housing 12, having a forward supersonic air inlet 14 and a rear exhaust nozzle 16. The supersonic inlet 14 is or may be of conventional design, such as a variable geometry inlet, and at supersonic cruise it functions to receive air at supersonic or hypersonic velocity and reduce the velocity of the air to a subsonic level. Positioned in the rear portion of the inlet 14 is a turbine 18 which is driven by air passing from the inlet 14 at a subsonic velocity. Connected to the turbine 18 is a rearwardly extending shaft 20, the rear end of which is connected to a rearwardly positioned compressor 22.

At a location rearwardly of the compressor 22, the housing 12 defines a combustion chamber 24 in which are positioned suitable igniters, indicated schematically at 26. The combustion chamber 24 connects directly to the outlet passage 28 defined by the exhaust nozzle 16, through which the combustion products from the combustion chamber 24 are directed to provide thrust for the engine 10.

At a location between the turbine 18 and the compressor 22, the housing 12 defines an air cooling heat exchange zone or chamber 30. As its name implies, this chamber 30 serves the purpose of cooling the air which passes into the chamber 30 from the turbine 18.

In this first embodiment, the temperature reduction in the heat exchange chamber 30 is accomplished by injecting a heat absorbing fuel directly into the air in the chamber 30. In the preferred form, the fuel is a cryogenic fuel, such as liquid hydrogen, a source of which is indicated schematically at 32. This fuel is injected into the air cooling heat exchange chamber 30 by means of a suitable injector or injectors, indicated at 34. The fuel passing from the injectors 34 vaporizes in the chamber 30 to cause the aforementioned reduction in compressor inlet temperature.

To describe the operation of the jet engine 10 of this first embodiment, let it be assumed that the engine 10 is mounted to an aircraft which is cruising at a velocity in the high supersonic or hypersonic speed range. Since at zero velocity and in the lower speed ranges, the engine 10 in this simplified configuration may presumably not develop adequate thrust, it must further be assumed that boost augmentation or other means may be required in conjunction with the engine 10 to bring the aircraft carrying the engine 10 up to a speed where the engine 10 can operate efficiently to provide thrust.

With the engine 10 traveling at high supersonic or hypersonic speeds, air passing into the inlet 14 is reduced to subsonic velocity and then passes through the turbine 18 to deliver power thereto and cause the turbine 18 to rotate. Since some of the energy in this air is imparted to the turbine 18, the air exiting from the rear of the turbine 18 experiences a reduction in total pressure and temperature. As the air passes from the turbine 18, it enters the air cooling heat exchange chamber 30, where the cryogenic fuel (e.g., hydrogen) is injected in the forward end of the chamber 30 through the fuel injectors 34. As the fuel passes from the injectors 34, it vaporizes into the air in the chamber 30 and causes a further reduction in total temperature of the air.

The resulting fuel/air mixture passes from the heat exchange zone 30 into the compressor 22. As this fuel/air mixture passes through the compressor 22, its total pressure and temperature is increased, since power from the turbine is transmitted through the shaft 20 to the compressor 22 and imparted to the air/fuel mixture passing through the compressor 22. The compressed fuel/air mixture then moves into the combustion chamber 24, where it is ignited by the ignition means 26. The combustion products resulting from this ignition pass out the exhaust nozzle 16 to provide thrust for the engine 10.

With respect to the operating characteristics of this engine 10, it will be noted first that since the combustion chamber 24 is positioned rearwardly of both the turbine 18 and the compressor 22, none of the rotating components of the engine 10 are exposed to total inlet temperature. Thus, as flight speed is increased, with the necessary increase of engine energy output, these rotating components are relieved of the necessity of high cost turbine materials to withstand high temperatures and also are relieved of the performance penalty in design complexity associated with blade cooling. With regard to the turbine, the increased inlet total temperature actually becomes an asset as the turbines work capability increases as flight speed increases. With regard to the compressor, since energy in the air stream is extracted by the turbine and since the fuel cools this air stream, the compressor does not see high inlet temperatures, resulting in higher compressor outlet pressure ratio in the tailpipe. The net result is that this engine 10 develops progressively superior performance as the flight speed is increased into the hypersonic speed regime, with no attendant metallurgical complications. The upper speed in this particular engine configuration is limited by the spontaneous ignition temperature of the particular fuel used, in conjunction with the turbine pressure ratio utilized.

In FIG. 2, there is shown a second embodiment of the jet engine of the present invention. Components of this second embodiment which are similar to those of the first embodiment will be given like numerical designations, with an "a" suffix distinguishing those of the second embodiment.

Thus, the jet engine 10a comprises a housing 12a having a forward inlet 14a and exhaust nozzle 16a. As in the prior embodiment, there is a forward turbine 18a connected by a shaft 20a to a rearwardly positioned compressor 22a. Rearwardly of the compressor 22a is the combustion chamber 24a with the ignition means 26a.

In the air cooling heat exchange zone 30a there is a heat exchanger 36, shown somewhat semi-schematically as a plurality of radially extending longitudinally aligned plates 38. Fuel is fed into the exchanger 36 through an inlet pipe 40 and passes from the heat exchanger through an outlet line 42. While not specifically shown herein, it is to be understood that the heat exchanger 36 is so arranged relative to the inlet 40 and outlet 42 that fuel passes through interior passageways of the plates 38 so as to be in heat exchange relationship with the air passing through the chamber 30a, but physically separated therefrom by the surfaces of the plates 38. The fuel passes from the heat exchanger 36 through the outlet line 42 and is discharged through a fuel outlet 44 into the rear combustion chamber 24a. In the combustion chamber 24a, the fuel mixes with the air discharged from the compressor 22a and is ignited by the ignition means 26a, with resulting ignition products passing out the exhaust nozzle 16a to provide thrust for the engine 10a.

Since in this second embodiment the fuel does not enter the air stream until the air passes into the combustion chamber 22a, there is no opportunity for spontaneous ignition of a fuel/air mixture in the compressor 22a or the heat exchange chamber 30a. Also, since no vaporized fuel is added to the air passing into the compressor 22a, the workload of the compressor 22a is reduced, thereby increasing the compressor outlet pressure for any given shaft power supplied by the turbine.

The mode of operation of the second embodiment is substantially the same as in the first embodiment, except that the fuel is placed in indirect heat exchange relationship with the air in the heat exchange chamber 30a instead of being injected directly into the air in the heat exchange chamber. Thus, as in the first embodiment the fuel does perform the function of cooling the air passing into the heat exchange chamber 30a. Since in other respects the principle of operation of the second embodiment is substantially the same as in the first embodiment, it will not be described in detail herein.

The third embodiment of the present invention is shown in FIG. 3. Since this third embodiment contains all the main components of the second embodiment, such components will be given like numerical designations with a "b" suffix disclosing those of the third embodiment.

Thus, as in the second embodiment, the engine 10b has a housing 12b, turbine 18b, compressor 22b, combustion chamber 24b, and heat exchanger 36b. However, in addition to the fuel heat exchanger 36b, there is provided an auxiliary heat exchanger 46 in the heat exchange zone 30b. This auxiliary heat exchanger 46 comprises a plurality of heat exchange blades 48 and has inlet and outlet lines 50 and 52, respectively, for the flow of the heat exchange medium through the heat exchanger 46. The additional energy extracted from the air stream by this auxiliary heat exchanger 46 can be used for powering, for example, some subsystem on the aircraft on which the engine 10b is mounted, and provides additional beneficial cooling of the compressor inlet air. Besides supplying power for some other system, by varying the performance of the auxiliary heat exchange apparatus 46 in a controlled manner, it is possible to compensate for variations in the fuel/air ratio to satisfy performance requirements without degrading the cooling function in the chamber 30b.

FIG. 4 shows yet a fourth embodiment of the present invention. Since this fourth embodiment contains all the main components of the third embodiment, like numerical designations will be used, with a "c" suffix distinguishing those of the fourth embodiment. Thus, this engine 10c has a housing 12c, turbine 18c, compressor 22c, fuel heat exchanger 36c, and an auxiliary heat exchanger 46c.

Additionally, there is a second fuel outlet line 54 leading from the fuel heat exchanger 36c to a location forward of the turbine 18c. Just aft of the inlet 14c and forward of the turbine 18c, the housing 12c defines a forward combustion chamber 56 having ignition means 58. The second fuel line 54 has a fuel discharge end 60 which injects the fuel into the forward combustion chamber 56.

The addition of the forward fuel chamber 56 permits the engine 10c to develop thrust at no speed or very low speeds, thus eliminating or alleviating the need for boost augmentation. Further, by controlling the amount of fuel combustion in the forward combustion chamber 56, it is possible to operate the engine at a constant turbine inlet temperature as the speed of the engine varies. This results in operation of the engine 10c at or near maximum turbine and compressor efficiency by permitting constant corrected speed operation of the turbine and compressor from take-off to cruise at the Mach number at which the engine is intended to operate.

FIG. 5 shows yet a fifth embodiment of the present invention. This fifth embodiment incorporates all the main components of the fourth embodiment, and again like numerical designations will be used, with a "d" suffix distinguishing those of the fifth embodiment. As in the fourth embodiment the engine 10d has a housing 12d, a turbine 18d, compressor 22d, a combustion chamber 24d, adjacent the exhaust nozzle 16d, and a second combustion chamber 56d just forward of the turbine 18d.

In addition, immediately rearwardly of the compressor 22d, there is provided an auxiliary combustion chamber 62 having fuel inlet means 64 connected to the heat exchanger 36d, and ignition means 66. Immediately rearwardly of the auxiliary combustion chamber 62 is an auxiliary power turbine 68 mounted to a rearward extension of the shaft 30d. Rearwardly of the auxiliary turbine 68 is the main combustion chamber 24d.

Positioned forwardly of the auxiliary combustion chamber 56d is a fan 70 mounted to a forward extension 72 of the shaft 20d. The fan 70 is surrounded by an outer cowling 74 which defines a fan bypass passageway 76 around an annular wall 77 surrounding a forward portion of the housing 12d.

Located in the forward end of the bypass passage 76 and rearwardly of the fan 70 are a number of fuel injecting elements 78 with associated ignition means 80. Additional fuel line means 82 direct a portion of the fuel from the main heat exchanger 36d to the fan bypass fuel injectors 78.

In addition to the operating features provided by components similar to those in the previous embodiments, the addition of the fan 70 ahead of the other engine components provides the capability for several additional operating features. For example, by employing means to vary the air flow through the bypass passage 76, control over the air flow through the housing 12d can be varied for desired performance requirements. The additional combustion means 78–80 in the bypass passage 76 gives the ability to increase thrust and thus increase the performance of the other engine components within the housing 12d. Also, the auxiliary combustion chamber 62 provides further flexibility to supply power to the fan 70.

To illustrate the operating characteristics of the present invention, let it be assumed that an engine were constructed according to the first embodiment of this invention and that it is operating in cruise condition at an altitude of 60,000 feet at a speed of Mach 5.78. With regard to the engine itself, let it further be assumed that the pressure ratio for each stage of the turbine is 2.5; that the adiabatic efficiency for each stage of the turbine is 0.92; that the ratio of each stage of the compressor is 1.3; that the adiabatic efficiency for each stage of the compressor is 0.95; and that the fuel used is liquid hydrogen. On the basis of the foregoing assumptions, the operating characteristics at selected stations along the length of the engine are given in the table below.

| | Static Pressure Lbs./Sq. Ft. | Total Pressure Lbs./Sq. Ft. | Static Temperature °R | Total Temperature °R | Velocity Ft./Sec. | Mach No. |
|---|---|---|---|---|---|---|
| Station A | 150 | 188,446 | 390 | 3,000 | 5,595 | 5.78 |
| Station B | 73,380 | 73,500 | 2,990 | 3,000 | 129 | .04 |
| Station C | — | 11,760 | — | 2,009 | — | — |
| Station D | — | 10,584 | — | 1,556 | — | — |
| Station E | 59,705 | 59,799 | 2,570 | 2,580 | 118 | .05 |
| Station F | 53,660 | 53,820 | 4,790 | 4,800 | 237 | .07 |
| Station G | 150 | 53,820 | 1,500 | 4,800 | 7,361 | 3.67 |

The stations are indicated in FIG. 1, and are as follows:

Station A: The front end of the inlet 14.
Station B: The location immediately forward of the turbine 18.
Station C: The location immediately to the rear of the turbine 18.
Station D: The location immediately forward of the compressor 22.
Station E: The location immediately to the rear of the compressor 22.
Station F: The location at the forward end of the exhaust nozzle 16.
Station G: The location at the rear end of the nozzle 16.

It is to be understood that the values in the table above are given only by way of example to illustrate the basic operating characteristics of the engine and are not intended to be limiting in any way. Further, it is to be understood that various modifications can be made to the above described embodiments without departing from the teachings of the present invention.

What is claimed is:

1. A jet engine particularly adapted for use in an aircraft traveling at high supersonic or hypersonic velocities, said engine comprising:
   a. a housing structure having an upstream inlet end to receive intake air and a downstream exhaust end to discharge jet exhaust,
   b. a supersonic inlet arranged to receive air and reduce said air to a subsonic velocity,
   c. a subsonic turbine mounted rearwardly of said inlet and arranged to be driven by subsonic air from the inlet, with the air expanding as it passes through said turbine,
   d. a compressor mounted in the housing downstream of the turbine to compress air discharged from the turbine, said compressor having a drive connection to the turbine so as to be driven thereby,
   e. said housing comprising means defining a combustion chamber located downstream of said compressor to react a fuel/air mixture and direct the resulting combustion products through the discharge end of the housing,
   f. said housing further defining a heat exchange zone located upstream of the compressor and downstream of the turbine to receive air discharged from the compressor,
   g. air cooling heat exchange and injecting means to place fuel for the engine in heat exchange relationship with air in the heat exchange zone to lower the temperature of the air and to inject said fuel into air passing through the engine for combustion therewith in the combustion zone.

2. The engine as recited in claim 1, wherein said fuel heat exchange and injecting means comprises means to cause vaporization of a vaporizable fuel in said heat exchange zone to absorb heat energy from air in the heat exchange zone.

3. The engine as recited in claim 2, wherein said fuel heat exchange and injecting means comprises means to inject said fuel directly into the air in the heat exchange zone so that the fuel is vaporized into the air in the heat exchange zone.

4. The engine as recited in claim 2, wherein said fuel heat exchange and injecting means comprises first means to pass the fuel in heat exchange relationship with air in the heat exchange zone, and second injecting means to inject the fuel into the air passing through the engine.

5. The engine as recited in claim 4, wherein said second injecting means comprises means to inject the fuel from the first means directly into the combustion chamber of the engine.

6. The engine as recited in claim 5, wherein said fuel heat exchange and injecting means comprises an injecting means to inject at least a portion of the fuel from the first means into air passing into and through the turbine.

7. The engine as recited in claim 6, further comprising ignition means to ignite fuel upstream of the turbine to provide a gaseous combustion product to supply power to said turbine.

8. The engine as recited in claim 4, wherein said fuel heat exchanger and injecting means comprises an injecting means to inject at least a portion of the fuel from the first means into air passing into and through the turbine.

9. The engine as recited in claim 8, further comprising ignition means to ignite fuel upstream of the turbine to provide a gaseous combustion product to supply power to said turbine.

10. The engine as recited in claim 4, further comprising an auxiliary heat exchange means in said heat exchange zone, whereby under conditions of variations of air and fuel requirements for said engine, said auxiliary heat exchange means is able to supply adequate heat exchange to satisfy cooling requirements in the heat exchange zone.

11. The engine as recited in claim 10, wherein said second injecting means comprises means to inject the fuel from the first means directly into the combustion chamber of the engine.

12. The engine as recited in claim 11, wherein said fuel heat exchange and injecting means comprises an injecting means to inject at least a portion of the fuel from the first means into air passing into and through the turbine.

13. The engine as recited in claim 12, further comprising ignition means to ignite fuel upstream of the turbine to provide a gaseous combustion product to supply power to said turbine.

14. The engine as recited in claim 10, wherein said fuel heat exchanger and injecting means comprises an injecting means to inject at least a portion of the fuel from the first means into air passing into and through the turbine.

15. The engine as recited in claim 14, further comprising ignition means to ignite fuel upstream of the turbine to provide a gaseous combustion product to supply power to said turbine.

16. The engine as recited in claim 4, wherein
   a. said engine has a second combustion zone located forwardly of the turbine, with fuel injecting means and ignition means to cause combustion of fuel in second combustion zone,
   b. said engine further comprises auxiliary heat exchange means in the heat exchange zone whereby under conditions of variations of air and fuel requirements of the engine, said auxiliary heat exchange means is able to supply adequate heat exchange to satisfy cooling requirements in the heat exchange zone, and
   c. said fuel and heat exchange means comprises first means to pass the fuel into heat exchange relationship with air in the heat exchange zone and second means to inject a portion of the fuel from the first means into the first named combustion zone.

17. The engine as recited in claim 1, further comprising means defining an annular bypass passageway around said housing structure, and a compressor fan mounted forwardly of said turbine and arranged to direct air discharged therefrom through said bypass passageway.

18. The engine as recited in claim 17, further comprising a second turbine positioned rearwardly of said first named compressor, and means to ignite fuel at a location forwardly of said second turbine, said second turbine having a power connection to said compressor fan to supply power to said compressor fan.

19. The engine as recited in claim 18, wherein said fuel heat exchange and injecting means comprises first means to pass the fuel in heat exchange relationship with air in the heat exchange zone, and second injecting means to inject the fuel into the air passing through the engine, said injecting means further comprising means to inject a portion of said fuel at a location forwardly of said second turbine.

20. The engine as recited in claim 17, wherein there is means to inject fuel into said bypass passageway, and ignition means to ignite the fuel in the bypass passageway to provide added thrust from the bypass passageway.

21. The engine as recited in claim 20, further comprising a second turbine positioned rearwardly of said first named compressor, and means to ignite fuel at a location forwardly of said second turbine, said second turbine having a power connection to said compressor fan to supply power to said compressor fan.

22. The engine as recited in claim 21, wherein said fuel heat exchange and injecting means comprises first means to pass the fuel in heat exchange relationship with air in the heat exchange zone, and second injecting means to inject the fuel into the air passing through the engine, said injecting means further comprising means to inject a portion of said fuel at a location forwardly of said turbine.

23. The engine as recited in claim 17, further comprising:
   (a) a second turbine positioned rearwardly of said first named compressor, and means to ignite fuel at a location forwardly of said second turbine, said second turbine having a power connection to said compressor fan to supply power to said compressor fan,
   (b) fuel heat exchange and injecting means comprising first means to pass the fuel in heat exchange relationship with air in the heat exchange zone, and second injecting means to inject the fuel into the air passing through the engine, said injecting means further comprising means to inject a portion of said fuel at a location forwardly of said second turbine, and
   (c) an auxiliary heat exchange means in said heat exchange zone, whereby under conditions of variations of air and fuel requirements for said engine, said auxiliary heat exchange means is able to supply adequate heat exchange to satisfy cooling requirements in the heat exchange zone.

* * * * *